United States Patent Office 2,816,935
Patented Dec. 17, 1957

2,816,935

PROCESS FOR THE PREPARATION OF ALKALI METAL DERIVATIVES OF CONJUGATED DIOLEFINS AND VINYL AROMATIC COMPOUNDS

Lloyd M. Watson, Norwood, Ohio, and Gerald H. Slattery, Paw Paw, Mich., assignors to National Distillers and Chemical Corporation, a corporation of Virginia Application August 17, 1955, Serial No. 529,078

13 Claims. (Cl. 260—665)

This invention relates generally to an improved process for preparation of metallo derivatives using alkali metals and, more particularly, to improvements in a process wherein hydrocarbons undergo reaction at increased reaction rates and at high selectivities and yields. More specifically, the invention relates to improvements in a process wherein aliphatic diolefins and vinyl aromatic compounds undergo dimerization in the presence of an alkali metal, preferably sodium, with obtainment of advantageous results as are discussed more fully hereinafter.

Various types of reactions are known for preparation of alkali metal compounds by reaction of an alkali metal with suitable organic intermediates and, for example, certain hydrocarbons, such as conjugated diolefins and vinyl aromatics, can be selectively dimerized by reaction in the presence of metallic sodium. In further example, one particularly valuable type of sodium derivative can be made from olefins, preferably those of the conjugated diolefin class, by reaction under selective conditions with metallic sodium. Under suitable conditions, the sodium addition products first formed dimerize selectively by coupling to provide a practical synthesis for desirable and highly valuable aliphatic hydrocarbon structures. Thus, the reaction of diolefins, such as butadiene, dimethyl butadiene, isoprene, and the methyl pentadienes with elemental sodium provides dimerized sodium derivatives which can be readily converted into useful products, for example, by carbonation to yield carboxylic acids. Vinyl aromatic compounds, such as styrene and alkyl-substituted styrenes, can also be dimerized to provide similar type products.

Sodium in massive form has been used for carrying out metalation reactions but studies of the products obtained, such as from reaction of sodium in massive form, have indicated that the products are complex mixtures whose components possess a wide range of molecular weights and contain high molecular weight rubber-type polymers. Such non-selective products are not desirable and possess relatively little, if any, value.

It has been discovered that, if a finely dispersed alkali metal, such as sodium dispersed in a suitable liquid medium, is used, the metalation reaction proceeds selectively to yield more desirable products in high yields. For example, an aliphatic conjugated diolefin, such as butadiene, may be initially treated with finely dispersed sodium in a suitable liquid ether medium to produce a disodiooctadiene product which can be carbonated to produce salts of $C_{10}$ dicarboxylic acids in high yields and selectivity. Other diolefins as well as vinyl aromatic compounds perform in similar manner.

In carrying out such reactions, the alkali metal employed for the metalation reaction should be in finely divided form. In general, this requires that alkali metal be in a finely dispersed state in a liquid reaction medium. Although either sodium or potassium may be used as the alkali metal reactant, the use of sodium is preferred over potassium since sodium gives excellent selectivities and yields of dimerized products, and it is cheaper and more readily available. Mixtures of sodium and potassium, and of sodium and calcium can also be used. In illustration, a sodium dispersion in which the average particle size is less than 50 microns is quite satisfactory for carrying out the process, the preferred size range being 5 to 15 microns. This dispersion is most conveniently made in an inert hydrocarbon as a separate step preliminary to the selective dimerization reaction with the diene or vinyl aromatic compound.

The reaction medium found most suitable for use consists essentially of an ether and only certain types of ethers are effective. These particular classes of ethers appear to have the common property of serving as promoters of the selective dimerization reaction involved. The ether can be any aliphatic mono ether having a methoxy group, in which the ratio of the number of oxygen atoms to the number of carbon atoms is not less than 1:4. Typical examples include dimethyl ether, methyl ethyl ether, methyl n-propyl ether, methyl isopropyl ether, and mixtures of these methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are preferred. Diethyl ether and hydrocarbon type solvents such as isooctane, kerosene, toluene, and benzene cannot be used exclusively as reaction media since they adversely affect the reaction.

The ethers should not contain any groups such as hydroxyl, carboxyl and the like which are distinctly reactive toward sodium. Although the ether may react in some reversible manner, it must not be subject to extensive cleavage, since such cleavage action destroys the ether, uses up sodium and introduces into the reacting system sodium alkoxide which, in turn, tends to induce rubber-forming reactions with the diene rather than promoting the desired dimerization reaction.

Although the reaction medium should consist essentially of the specified ethers, other inert media can be present in limited amounts. In general, these inert media will be introduced with the alkali metal dispersion as the liquid in which the metal is suspended and will act chiefly as diluents. The concentration of ether in the reaction mixture should at all times be maintained at a sufficient level to have a substantial promoting effect upon the desired dimerization reaction.

It is generally desirable to include in the dimerization reaction mixture at least one supplementary activating material, such as for example, a relatively small amount of at least one material of the polycyclic aromatic compound type, inclusive of condensed ring hydrocarbons such as naphthalene and phenanthrene, as well as the uncondensed polycyclic compounds such as diphenyl, the terphenyls, dinaphthyl, tetrophenylethylene, and the like. The polyphenyl compounds such as diphenyl and the terphenyls and their mixtures have been found to be particularly useful. The amount of the hydrocarbon to be used will vary over a range which, in every case, will be relatively small in comparison with the amount of diolefin or vinyl aromatic compound undergoing reaction. Concentrations in the range of 1 to 10 weight percent based on the amount of diolefin or vinyl aromatic compound are ordinarily quite sufficient.

Additionally, it is desirable, in carrying out the reaction between the alkali metal and the material to be dimerized, to utilize a solid friable attrition agent as use thereof generally results in improved utilization of the alkali metal. That is, the use of appropriate sized attrition agent and, preferably, one which is capable of undergoing pulverization under the conditions of the reaction, generally effects a substantial rise in yield of dimerization products based on the alkali metal utilized and at the same time maintains the same high selectivity of dimerization and high yields based on the diolefin.

Amounts of the attrition agents in the range of 2.5 to 8 parts to one part of solid alkali metal have been found to be generally satisfactory, although smaller and larger amounts are effective but to smaller degrees, in the first place because of the limited attrition action, and in the second place because too much reactor volume is taken up by the attrition agent itself. The attrition agent should be of an easily friable nature. Suitable materials include inorganic solids such as alkali metal salts from the classes of the halides and sulfates, for example sodium chloride, potassium chloride, sodium sulfate, potassium sulfate, and the like. Also useful is the class of compounds which consists of metallic and non-metallic oxides which are not reactive with the alkali metal (e. g., sodium) under the conditions of the reactions. Thus, sand (silicon dioxide), diatomaceous earth (Cellite), rutile, iron oxide, magnesia and alumina operate satisfactorily. Other materials, inert to the reaction, such as graphite, zircon and powdered coal, are also operable.

The diolefins which can be used for this improved process include any aliphatic conjugated diolefins, for example, butadiene, isoprene, dimethyl butadiene, the pentadienes, as the methyl-1,3-pentadienes, and the like. In general, it is desirable to use the aliphatic conjugated diolefins having from 4 to 8, inclusive, carbon atoms. The method is particularly well adapted to the use of butadiene as the diolefin. Also vinyl aromatic compounds such as styrene, and ortho and paramethyl styrene can be employed.

The metalation process is preferably carried out at a temperature below about 0° C., with a temperature range of between —20 to —50° C. being preferred. Generally speaking, all ethers begin to yield cleavage products at temperatures of about 0° C. and above with the result that sufficient alkoxides are formed to yield high polymeric acids rather than the desired low molecular weight dimers.

In one typical method for carrying out the improvements of this invention the sodium or potassium dispersion is initially prepared by placing an inert hydrocarbon such as isooctane in a suitable vessel with the appropriate amount of sodium. The mixture is heated in a surrounding bath or otherwise until the sodium has melted (M. P. 97.5° C.). Then a suitable high speed agitator is started and, preferably, an emulsifier consisting, for example, of ½ percent (based on sodium) of the dimer of linoleic acid is added. After a short period of agitation, a test sample of the dispersion shows the particle size to be in the 5 to 15 micron range.

The stirring is stopped and the dispersion is allowed to cool to room temperature. This dispersion is now ready to be used in the selective dimerization. Inert liquids such as saturated dibutyl ether, normal octane, n-heptane, or straight run kerosenes, may be employed as suspension media for the dispersion. Any such dispersion having sufficiently finely divided sodium or potassium will suffice. Other well-known substances may be used instead of the dimeric linoleic acid as the dispersing agents.

The dispersion is added to the ether which is precooled to and preferably maintained between —20° to —50° C. The solid attrition agent is then added and the diolefin or vinyl aromatic compound is introduced slowly. One quite satisfactory method is to introduce this reactant into the reaction vessel at approximately the same rate as that at which it reacts with the sodium. For maximum reaction rate of the dimerization, it is desirable to maintain substantially constant agitation with the reaction mixture.

The dimetallic derivatives of the diolefin dimers are rapidly and selectively formed under these conditions. These products, depending on the diolefins, may be either soluble or insoluble in the reaction medium. In general, they tend to form slurries, as for example, the disodiooctadiene product from sodium and butadiene.

These dimetallic derivatives can either be isolated as such, or, since they tend to be unstable and difficult to handle, they can be directly and immediately thereafter subjected to further reactions to form valuable derivatives. For example, subsequent carbonation of the mixture containing the products yields the salts of dicarboxylic acids. The carbonation may be done by subjecting the dimetallic-diene derivative to dry gaseous carbon dioxide, by contact with solid carbon dioxide or by means of a solution of carbon dioxide. The temperature should be controlled below 0° C. to avoid the formation of unwanted by-products. This carbonation forms the dimetallic salts of the unsaturated aliphatic dicarboxylic acids. These salts will contain two more carbon atoms than the dimetallic dimers from which they are produced. In the case where butadiene is the starting aliphatic diolefin, there results by this method the selective production of $C_{10}$ unsaturated dicarboxylic acids.

The use of the attrition agents introduces no unusual or difficult separation problems. Water soluble attrition agents can be dissolved away by water from the more insoluble organic products, particularly the higher molecular weight free acids. If the attrition material is water insoluble such as an oxide, then the separation can be made by other simple mechanical or physical means; one convenient way is to separate the acidic products as their water soluble salts.

The unsaturated diacid products find use as chemical intermediates, and are valuable in the preparation of polymers and copolymers, plasticizers, and drying oils. They, as well as other derivatives, are useful in esters, polyesters and polyamide resins and, generally, as chemical intermediates.

In addition, the unsaturated diacids or their salts or other derivatives can be hydrogenated at the double bonds to yield the corresponding saturated compounds, particularly the saturated diacids. For example, the disodiooctadiene product obtained from butadiene ultimately gives a practically quantitative yield of a mixture of $C_{10}$ aliphatic diacids, including sebacic acid, 2-ethylsuberic acid, and 2,2'-diethyladipic acid.

In processing as aforedescribed, the reaction between the alkali metal and the olefinic material to be dimerized may be carried out in batch-wise manner or as a continuous operation in which case the product of reaction, that is the mixture resulting from the metalation reaction, is transferred, such as through suitable conduits, to the subsequent processing operations, such as to a carbonator for carbonation of the metallo derivatives of the dimers, and thence to a hydrolyzer wherein the carbonated mixture is mixed with water whereby metallic sodium that has passed through the system is destroyed. Under certain conditions for carrying out the metalation reaction, the dispersed particles of alkali metal tend to form massive chunks of reagglomerated metal, such formation taking place even when the mixture undergoing reaction is subjected to vigorous agitation, such as is accomplished by rapid stirring, ball mill operations, etc. Under certain other conditions, formation of polymeric materials in excessive amount tends to occur and which, in addition to enhancing losses of reactant material, present difficulties in product separation due to emulsification. Aside from the disadvantages that such formation of agglomerates and polymeric materials produces from the viewpoint of rendering the alkali metal in less reactive form with decreased utilization of the metal and other reactants for the desired reaction, the formation thereof imparts a highly objectionable feature in that the large lumps induce clogging of processing equipment, transfer lines, etc. in which the reaction mixture containing agglomerated alkali metal particles and/or polymeric materials is handled. For example, in batch operations, the formation of agglomerated particles of the finely dispersed alkali metal and/or polymeric materials tends to decrease efficiency of equipment utilized for maintaining the reaction mixture under agitation, for transference of the reaction mixture to subsequent operations, etc. In particular, the formation and presence of agglomerated particles of the finely dispersed alkali metal and/or polymeric material in the metalation reaction mixture are objectionable in continuous operations wherein the metalation mixture is passed from the metalating reactor through conduit or conduits to subsequent operations. For example, in a process as aforedescribed and operated in continuous manner, the agglomerated particles of alkali metal present in the metalation reaction mixture are not removed until the mixture, following carbonation, is mixed with water to destroy the alkali metal that has passed through the system in reactive form. A major disadvantage that results by the presence of agglomerated alkali metal particles in such a process is that they tend to clog up the processing equipment, particularly transfer lines, to the extent that frequent shutdowns are necessary for cleaning out the system. Such shutdowns obviously introduce an expense of major extent in processes of the aforedescribed type.

It has been found that, by use of the alkali metal in finely dispersed form in a controlled ratio with respect to the material to be dimerized in the metalation reaction, the frequency of formation of objectionable agglomerations of the alkali metal and polymeric material is markedly reduced, and that such a decrease in frequency of occurrence of objectionable agglomerations and polymeric material formation provides a marked improvement in the aforedescribed process in that it may be carried out with improved efficiency of operation. For example, and in continuous operation, use of a controlled ratio of alkali metal in finely dispersed form to olefinic reactant in the metalation reaction reduces the frequency of formation of objectionable agglomerates and/or polymeric materials to the extent that the process may be carried out for markedly extended periods of time without necessity for shutdowns due to clogging of equipment, particularly transfer lines.

In accordance with this invention, a process as aforedescribed, for reaction of finely divided alkali metal with an olefinic material under selective conditions for formation in high yields of the alkali metal derivatives of dimers of the olefinic material, is carried out by use of the olefinic reactant in an amount less than the stoichiometric ratio of the olefinic material or, expressed otherwise, the metalation reaction is carried out in the presence of the alkali metal in finely dispersed form in an amount that is in excess of that stoichiometrically equivalent to the amount of olefinic material employed with the alkali metal being in excess within a rather well-defined range. Generally speaking, the invention embodied herein comprises carrying out the metalation reaction with use of an alkali metal in finely dispersed form in an amount that is in excess of the stoichiometric ratio for reaction of one mol of alkali metal to one mol of the olefinic reactant but less than an excess of about 15% over the stoichiometric ratio for mol to mol reaction of the alkali metal with the olefinic reactant. In illustration, and by use of butadiene and metallic sodium in finely divided form for the metalation reaction, the invention may be carried out by use for the metalation reaction of from less than about 2.34 (stoichiometric ratio=2.34 parts of butadiene to one part of sodium) to about 2.0 or more parts by weight of butadiene to one part of sodium. For such a reaction, use of a controlled ratio of alkali metal to olefinic reactant has resulted in marked unexpected improvements in that use of butadiene in an amount less than about 2.0 parts to one part of sodium has resulted in formation of objectionable agglomerated alkali metal particles in such frequency that frequent shutdown of operating equipment has been necessary whereas, additionally, use of an amount of butadiene that is not less than about 2.34 parts by weight to one part of sodium has resulted in objectionable yields of polymeric materials and emulsification difficulties whereby the reaction mixture is rendered difficult to process by conventional means such as filtering, centrifuging, and the like, for separation of desired products.

In order to illustrate practice of the invention in specific embodiments thereof but without intent of limitation thereto, a process as aforedescribed was carried out in continuous manner by subjecting butadiene to reaction with metallic sodium in finely dispersed form in the presence of sodium chloride (attrition agent), a small amount of paraterphenyl, and dimethyl ether, the temperature for the metalation reaction being controlled to $-20$ to $-30°$ C. In the embodiment described, the metalation was carried out in a reactor provided with a stirrer for maintaining the reacting mixture under vigorous agitation and a conduit for passage of reaction product to a carbonator wherein the metalation reaction product was contacted with an excess of Dry Ice or a solution of excess dissolved carbon dioxide to provide a white slurry consisting of solid sodium chloride and a mixture of disodiooctadienes. Excess carbon dioxide and dimethyl ether were allowed to evaporate from the slurry, leaving a sodium chloride-sodium carboxylate mixture which was then dissolved in an excess of hot water, following which the free organic acids were precipitated by addition of concentrated hydrochloric acid. The free organic acids consisted essentially of $C_{10}$ aliphatic dicarboxylic acids substantially insoluble in aqueous solution and which consequently formed an upper organic layer which was separated. Ether extraction of the aqueous solution yielded an additional, small amount of the organic diacids. A yield of crude, distilled diacids having an average neutral equivalent of 106 was obtained.

This free unsaturated acid product was then converted to the corresponding methyl esters, which were then hydrogenated over a nickel catalyst. The resulting saturated product was fractionally distilled under vacuum. By this distillation, three pure ester fractions were obtained. These ester fractions were saponified and the free diacid products were recovered as follows.

Sebacic acid melting at 134.5° C. was recovered in 35% yield. The neutral equivalent was 101.2.

2-ethylsuberic acid was isolated in 47% yield with a melting point of 73.7° C. It showed a neutral equivalent of 101.2.

2,2'-diethyladipic acid was obtained in 10% yield. This acid has two asymmetric carbon atoms and, therefore, exists in meso and racemic forms. These are reported in the literature to melt at 57° C. and 137° C., respectively. The product obtained in this process yielded two forms melting at 55° to 57° C. and 135° to 138° C., respectively; neutral equivalent, 101.3.

The process aforedescribed was carried out under similar conditions with the exception that, in different runs, the sodium to butadiene ratio was varied as shown below. The results obtained from each of the runs with respect to frequency of formation of objectionable agglomerates of alkali metal particles and/or polymeric material, as reflected by the period of time that the operation could be operated before shutdown was necessary, are shown in the following tabulation.

| Ratio of butadiene:sodium (weight) (Stoichiometric amount=2.34 parts of butadiene to one part of sodium) | Length of run (in hours) |
| --- | --- |
| 2.4:1 | Less than 30. |
| 2.32:1 | 73. |
| 2.24 | 130. |
| 2.15 | 170. |
| 2.0 | 20–60. |
| <2.0 | 15 or less. |

From the foregoing, it will be observed that when the butadiene was used in excess of the stoichiometric ratio (2.34) for reaction of one mol of butadiene with one mol of sodium, the length of the run was relatively low; and similarly, when the butadiene was used in an amount of less than two parts to one part of sodium (i. e., a 16% excess of sodium over stoichiometric ratio), the length of run was also relatively low. However, as will be further observed, when a controlled ratio of butadiene to sodium was between 2.34 and 2.0, markedly improved results were obtained as to the continuous length of time that the process could be operated before requiring shutdown.

Although the invention has been described in a specific embodiment by use of butadiene and sodium as reactants for the metalation reaction, it is not intended that the invention be limited thereto as its contemplated practice includes similar processing with use, for the metalation reaction of combinations of reactants, attrition agents, dimerization activators, and alkali metal dispersants as shown hereinafter.

| Olefinic reactant | Aromatic hydrocarbon | Attrition agent | Alkali metal dispersant |
|---|---|---|---|
| Isoprene | Paraterphenyl | Sodium chloride | Refined kerosene. |
| 4-methyl-1,3-pentadiene | do | do | Do. |
| 2-methyl-1,3-pentadiene | do | do | Do. |
| Styrene | o-Terphenyl | do | Isooctane. |
| Butadiene | do | Sodium sulfate | Refined kerosene. |
| Do | do | Sand (average 200 microns) | Do. |
| Do | do | Zircon (365 mesh) | Mineral spirits. |
| Do | do | Powdered graphite | Do. |
| Do | do | Magnesium oxide | Do. |
| Do | do | Potassium chloride | Do. |

In practice of the process embodied herein with use of an attrition agent in the metalation reaction, the process may be carried out in a number of ways and, hence, it is not intended to limit it to any particular technique with respect thereto. For instance, an attrition agent such as a relatively coarse salt, or oxide or other suitable material can be added to an attrition reactor in contact with the solid dispersed metallic sodium and the reaction medium wherein the salt is simultaneously ground down to an effective particle size. Or, the attrition agent may be preground before introduction into the reactor and/or before introducing sodium and other reactants. The former method is to be preferred in large scale industrial operations since the reaction of the sodium with the conjugated diolefin or vinyl aromatic compound can be initiated substantially simultaneously with the start of the attrition.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process which comprises selectively reacting a hydrocarbon selected from the group consisting of conjugated diolefins and vinyl aromatic compounds with a finely dispersed alkali metal in a reaction medium consisting substantially of an ether selected from the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups and mixtures thereof at a temperature below about 0° C. and in the presence of a small amount of a polycyclic aromatic hydrocarbon thereby selectively forming the corresponding dialkali metal derivatives of the dimers of said hydrocarbon, said reaction being carried out with use of the alkali metal in excess of that theoretically required for mol to mol reaction of alkali metal with said hydrocarbon but in excess of not more than about 15%.

2. A process, as defined in claim 1, wherein the hydrocarbon is an aliphatic diolefin of from 4 to 8 carbon atoms.

3. A process, as defined in claim 1, wherein the polycyclic aromatic hydrocarbon is paraterphenyl.

4. A process, as defined in claim 1, wherein the hydrocarbon reactant is butadiene.

5. A process, as defined in claim 1, wherein the alkali metal is sodium.

6. A process, as defined in claim 1, wherein the reaction medium consists substantially of dimethyl ether.

7. A process, as defined in claim 1, wherein the hydrocarbon reactant is butadiene, the alkali metal is sodium, and the reaction medium consists substantially of dimethyl ether.

8. A process, as defined in claim 7, wherein the reaction is carried out in presence of a solid, friable attrition agent.

9. A process, as defined in claim 8, wherein the attrition agent is sodium chloride.

10. A process which comprises selectively reacting a hydrocarbon selected from the group consisting of conjugated diolefins and vinyl aromatic compounds with a finely dispersed alkali metal in a reaction medium consisting substantially of an ether selected from the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups and mixtures thereof at a temperature below about 0° C. and in the presence of a solid, friable attrition agent thereby selectively forming the corresponding dialkali metal derivatives of the dimers of said hydrocarbon, said reaction being carried out with use of the alkali metal in an amount in excess of that theoretically required for mol to mol reaction of alkali metal with said hydrocarbon but in excess of not more than about 15%.

11. A process, as defined in claim 10 wherein the hydrocarbon is butadiene, the alkali metal is sodium, and the reaction medium is dimethyl ether.

12. A process, as defined in claim 10, wherein the attrition agent is sodium chloride.

13. A process, as defined in claim 10, wherein the reaction is carried out in presence of a small amount of a polycyclic aromatic hydrocarbon.

References Cited in the file of this patent

UNITED STATES PATENTS

| | | |
|---|---|---|
| 2,027,000 | Scott | Jan. 7, 1936 |
| 2,352,461 | Walker | June 27, 1944 |
| 2,631,175 | Crouch | Mar. 10, 1953 |
| 2,716,662 | Cohen et al. | Aug. 30, 1955 |
| 2,773,092 | Calley et al. | Dec. 4, 1956 |

OTHER REFERENCES

Hansley: Ind. and Eng. Chem., vol 43, No. 8, 1951, pp. 1759–1766.